United States Patent
Jones et al.

(10) Patent No.: US 7,034,582 B2
(45) Date of Patent: Apr. 25, 2006

(54) ELECTRONIC CIRCUITS

(75) Inventors: Philip Matthew Jones, Cambridge (GB); Christopher James Newton Fryer, Cottenham (GB)

(73) Assignee: Pelikon Limited, Caerphilly (GB)

( * ) Notice: Subject to any disclaimer, the term of this patent is extended or adjusted under 35 U.S.C. 154(b) by 0 days.

(21) Appl. No.: 10/466,697

(22) PCT Filed: Feb. 26, 2002

(86) PCT No.: PCT/GB02/00833

§ 371 (c)(1),
(2), (4) Date: Apr. 7, 2004

(87) PCT Pub. No.: WO02/069674

PCT Pub. Date: Sep. 6, 2002

(65) Prior Publication Data

US 2004/0169547 A1    Sep. 2, 2004

(30) Foreign Application Priority Data

Feb. 26, 2001    (GB)  .................................... 0104722

(51) Int. Cl.
*H03B 19/00*    (2006.01)

(52) U.S. Cl. .................................... 327/111; 327/494
(58) Field of Classification Search ................ 327/111, 327/423, 494, 508, 587–588; 315/224, 169.3, 315/45, 200 R, 205
See application file for complete search history.

(56) References Cited

U.S. PATENT DOCUMENTS

| | | | | |
|---|---|---|---|---|
| 5,808,884 A | * | 9/1998 | Teggatz et al. | 363/98 |
| 5,821,701 A | * | 10/1998 | Teggatz et al. | 315/307 |
| 5,861,719 A | | 1/1999 | Koskowich et al. | 315/209 |
| 5,982,104 A | | 11/1999 | Sasaki et al. | 315/169.3 |
| 5,982,105 A | | 11/1999 | Masters | 315/169.3 |
| 6,011,382 A | | 1/2000 | Littlefield et al. | 323/222 |
| 6,038,153 A | * | 3/2000 | Andersson et al. | 363/97 |
| 6,081,075 A | * | 6/2000 | Littlefield | 315/209 R |
| 6,087,863 A | | 7/2000 | Aflatouni | 327/111 |
| 6,091,164 A | * | 7/2000 | Buell | 307/82 |
| 6,175,191 B1 | | 1/2001 | Yamazaki | 315/169.3 |
| 6,297,597 B1 | * | 10/2001 | Buell | 315/169.3 |

(Continued)

FOREIGN PATENT DOCUMENTS

EP    0782373    7/1997

(Continued)

*Primary Examiner*—My-Trang Nu Ton
(74) *Attorney, Agent, or Firm*—Sutherland Asbill and Brennan LLP

(57) ABSTRACT

A high voltage AC power supply circuit for a capacitive load $C_L$, such as an electroluminescent lamp, includes a low voltage DC supply, an inductor L and a FET S in series. The FET S can be pulsed so that the inductor L generates a voltage to charge the capacitive load $C_L$ via an H-bridge H, which is in parallel with the FET S. A diode D prevents current discharging from the capacitive load $C_L$ while the FET S is closed. The total capacitance downstream of the diode D and in parallel with the capacitive load $C_L$ is less than the capacitive load $C_L$, so that when the polarity of the H-bridge is reversed, the voltage across the H-bridge collapses to earth and the capacitive load $C_L$ is discharged via the low voltage DC supply. The circuits which a employ a large smoothing capacitor in parallel with the H-bridge.

4 Claims, 3 Drawing Sheets

U.S. PATENT DOCUMENTS

| | | | |
|---|---|---|---|
| 6,320,323 B1 * | 11/2001 | Buell et al. | 315/169.3 |
| 6,462,485 B1 * | 10/2002 | Kimball | 315/169.3 |
| 6,597,123 B1 * | 7/2003 | Buell et al. | 315/169.3 |
| 6,674,243 B1 * | 1/2004 | Kato | 315/169.3 |
| 6,693,387 B1 * | 2/2004 | Wood | 315/169.3 |

FOREIGN PATENT DOCUMENTS

| | | |
|---|---|---|
| EP | 0971565 | 1/2000 |
| WO | WO 99/55121 | 10/1999 |
| WO | WO 00/72638 | 11/2000 |

* cited by examiner

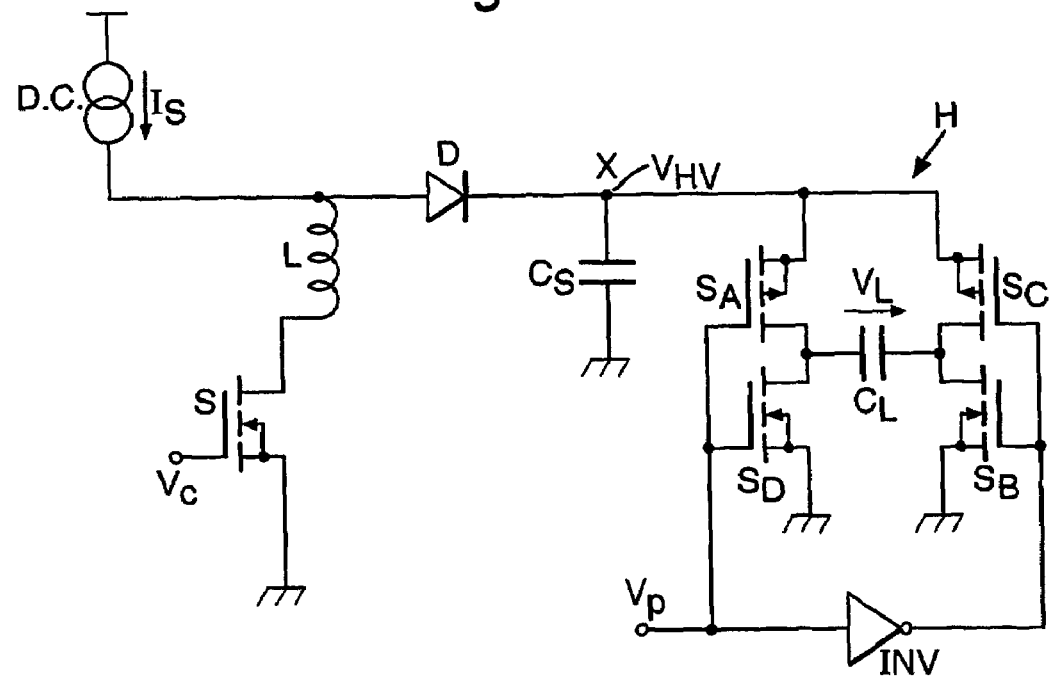
Fig.3.
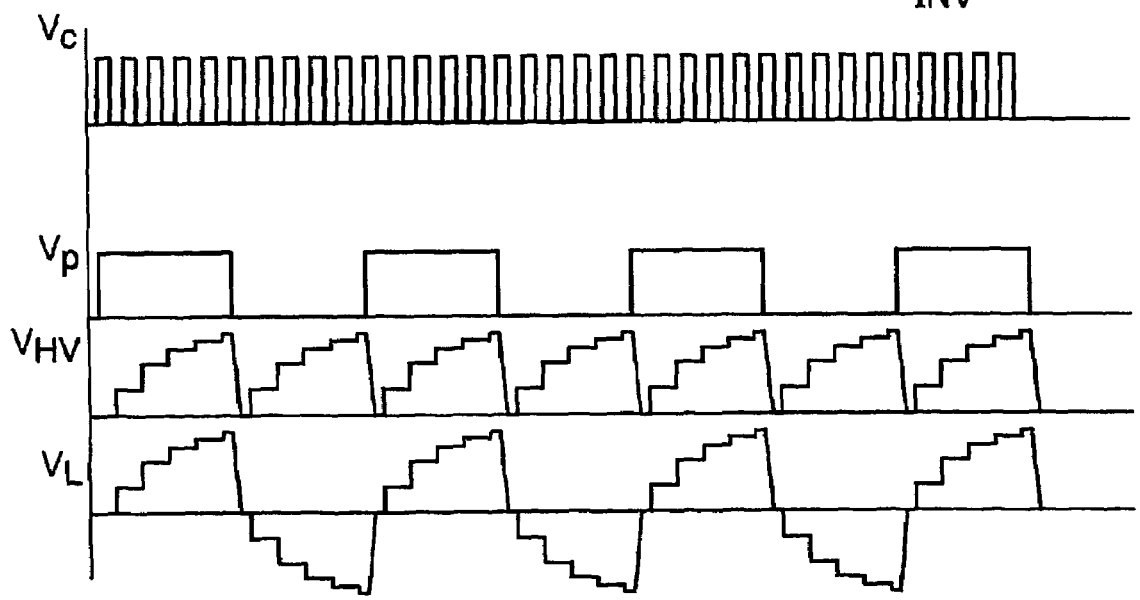

ELECTRONIC CIRCUITS

TECHNICAL FIELD

The present invention relates to electronic circuits, and in particular to electronic circuits which can be used in a high voltage power supply for a capacitive load, such as an electroluminescent lamp.

BACKGROUND OF THE INVENTION

Electroluminescent lamps generally comprise a layer of phosphor material, such as a doped zinc sulphide powder, between two electrodes. It is usual for at least one electrode to be composed of a transparent material, such as indium tin oxide (ITO), provided on a transparent substrate, such as a polyester or polyethylene terephthalate (PET) film. The lamp may be formed by depositing electrode layers and phosphor layers onto the substrate, for example by screen printing, in which case opaque electrodes may be formed from conductive, for example silver-loaded, inks. Examples of electroluminescent devices are described in WO 00/72638 and WO 99/55121.

An electroluminescent lamp of the general type described above is illuminated by applying an alternating voltage of an appropriate frequency between the electrodes of the lamp to excite the phosphor. Commonly, the phosphors used in electroluminescent lamps require a voltage of a few hundred volts. Typically, such electroluminescent lamps may have a capacitance in the range 100 pF to 1 μF.

The inventors have been involved in the development of electroluminescent displays which comprise electroluminescent lamps having selectively illuminable regions for displaying information. Such displays have the advantage that they can be large, flexible and relatively inexpensive. In the context of such electroluminescent displays, the inventors have sought to provide a simple power supply arrangement for an electroluminescent lamp or display.

A known type of circuit for producing a higher output voltage from a low voltage DC supply is a "flyback converter". Such a circuit comprises an inductor and an oscillating switch arranged in series. In parallel with the oscillating switch, a diode and a capacitor are arranged in series. The switch oscillates between an open state and a closed state. In the closed state, a current flows from the DC supply through the inductor and the switch. When the switch is opened, the current path is interrupted, but the magnetic field associated with the inductor forces the current to keep flowing. The inductor therefore forces the current to flow through the diode to charge the capacitor. The diode prevents the capacitor discharging while the switch is closed. The capacitor can therefore be charged to a voltage which is higher than the DC supply voltage, and current at this voltage can be drawn from the capacitor.

In order to supply an alternating current to a load from a flyback converter, an H-bridge may be provided in parallel with the capacitor. In general, an H-bridge comprises two parallel limbs, each limb having a first switch in series with a second switch. On each limb between the first and second switches there is a node, and the load is connected between the respective nodes of the limbs. Current can flow through the load in one direction via the first switch of one limb and the second switch of the other limb and in the other direction via the other two switches. The switches of the H-bridge are operated so that current flows through the load first in one direction and then in the other.

When an H-bridge is used to supply a capacitive load $C_L$ with a supply voltage V, during the first half of the cycle of operation, the load $C_L$ is at +V. When the H-bridge switches and reverses the polarity of the load, there is a potential difference of −2V between the supply voltage and the load. The load is supplied rapidly with current from the supply until there is no potential difference, and this requires $2C_L V^2$ of energy. Similarly, when the H-bridge is switched to return the load to the original polarity at the end of the cycle, a further $2C_L V^2$ of energy is required to bring the load back to +V.

It will be seen, therefore, that each cycle of the operation of the H-bridge requires $4C_L V^2$ of energy. The power consumption, assuming 100% efficiency, is $4C_L V^2 f$, where f is the cycling frequency of the H-bridge. This represents a significant power consumption when the frequency and the voltage are large.

It is usual to provide a large smoothing capacitor (such as the capacitor of the flyback converter described above) in parallel with the H-bridge in order to provide current for the rapid charging and discharging of the capacitive load. The smoothing capacitor protects the power supply from the large currents which result from the switching of the polarity of the H-bridge, and ensures that the supply voltage does not drop significantly.

The inventors have realised, however, that if the smoothing capacitor is chosen to be smaller than the capacitive load, when the polarity of the H-bridge is switched, the current drawn from the smoothing capacitor by the capacitive load fully discharges the smoothing capacitor and the high voltage supply collapses. In this case, almost immediately after the H-bridge has been switched, the current supplied to the capacitive load is drawn directly from the low voltage DC supply, rather than from a store of charge at high voltage in a large smoothing capacitor.

SUMMARY OF THE INVENTION

The present invention provides an electronic circuit for supplying a capacitive load with an alternating high voltage from a lower voltage DC supply, the circuit comprising:

an H-bridge having two parallel limbs, each limb having a first switching element in series with a second switching element and a node between the first and second switching elements, the capacitive load being connected, in use, between the respective nodes of the limbs;

a converter powered by the low voltage DC supply and arranged to supply current to the H-bridge to charge the capacitive load to a voltage which is higher than the DC supply voltage; and a diode arranged in series between the converter and the H-bridge to prevent current flowing back from the charged capacitive load, wherein the switching elements of the H-bridge are controlled alternately such that in a first condition the first switching elements of one limb and the second switching elements of the other limb conduct to supply current from the converter to the capacitive load in one direction, and in a second condition the other two switching elements of the limbs conduct to supply current from the converter to the capacitive load in the opposite direction, and the total capacitance provided in parallel with the H-bridge downstream of the diode is less than the capacitance of the capacitive load.

In accordance with this arrangement, when the H-bridge is switched from the first condition to the second condition or vice versa, at least some of the current which recharges the reversed capacitive load is drawn from the circuit upstream of the diode, where the voltage is lower. In this way, the power consumption required to operate the circuit is significantly reduced compared to an arrangement in which current is supplied to recharge the capacitive load from a large smoothing capacitor.

Preferably, the total capacitance provided in parallel with the H-bridge downstream of the diode is less than 50% of the capacitance of the capacitive load. In a preferred arrangement, this capacitance is between 10% and 20% of the capacitance of the capacitive load.

A smoothing capacitor may be provided upstream of the diode in parallel with the H-bridge in order to compensate for the imperfect switching of the switching elements of the H-bridge. However, the capacitance of the switching capacitor is kept small in accordance with the invention.

The diode may be any suitable device which allows current flow in one direction only over the range of operating voltages of the circuit and the term "diode" is used herein accordingly. The role of the diode is to allow a higher voltage than the DC supply voltage to be stored on the capacitive load without current flowing back from the capacitive load towards the converter resulting in discharge of the capacitive load.

The switching elements may be any suitable switching devices and, in general, are transistors. In the preferred arrangement, the switching elements are field effect transistors (PETs). In a particularly preferred arrangement, the first switching elements are p-channel FETs and the second switching elements are n-channel FETs.

The operation of the switching elements of the H-bridge may be controlled by any suitable means. In a preferred arrangement, a polarity voltage is applied to the switching elements, for example to the gates of the FETs. The polarity voltage may be a pulse width modulated signal. Thus, the circuit may further comprise an oscillator arranged to generate the polarity voltage. In a particularly convenient arrangement, the signal from the oscillator may also be used by the converter in order to provide synchronised operation of the converter and the H-bridge, optionally by means of a divider. Typically, the frequency of the polarity voltage is in the range 50 Hz to 10 kHz.

The converter may be any suitable converter such as a forward converter or a flyback converter. In a preferred arrangement, the converter is a flyback converter.

The flyback converter may comprise an inductive element and an output switching element arranged in series. The output switching element is arranged to alternate, in use, between a first state and a second state, whereby in the first state a current path is provided through the inductive element and the output switching element, which current path is interrupted in the second state, such that when the output switching element changes from the first state to the second state, the inductive element generates a voltage at an output of the circuit for charging a capacitive load. An output diode may prevent current flowing back from the output while the output switching element is in the first state.

The inductive element may be any suitable component which is capable of operating in the required manner, such as an inductor or coil. Typically, the inductive element may have an inductance in the range 50 µH to 50 mH, for example 470 µH.

The output diode may be any suitable device which allows current flow in one direction only over the range of operating voltages of the circuit. The role of the output diode is to allow a higher voltage than the DC supply voltage to be stored on the capacitive load without current flowing back from the capacitive load towards the inductive element.

The output switching element may be any suitable switching device and, in general, is a transistor. In the preferred arrangement, the switching element is a field effect transistor (FET). In a particularly preferred arrangement, the output switching element is an n-channel FET.

Advantageously, the output switching element may be connected directly to earth potential. According to this arrangement, the switching element is not required to be able to switch at high voltage, which simplifies the design of the circuit.

The operation of the output switching element may be controlled by any suitable means. In a preferred arrangement, a control voltage is applied to the switching element, for example to the gate of the FET. The control voltage may be a pulse width modulated signal. Typically, the frequency of the control voltage is in the range of 10 to 100 kHz. The circuit may further comprise an oscillator arranged to generate the control voltage. In a particularly convenient arrangement, the signal from the oscillator may also be used by the H-bridge in order to provide synchronised operation of the circuit and the H-bridge.

Current may be supplied to the converter from a DC supply. Thus, the capacitive load may be charged from the DC supply by means of the inductive element and the output switching element.

Typically, the DC supply has a voltage of less than 100 V, for example in the range 2 to 24 V. The capacitive load may be charged to a peak voltage between 5 to 500 times that of the supply voltage. Typically, the peak voltage is in the range 10 to 100 times that of the supply voltage.

The output switching element may be arranged to alternate between the first and the second state at a frequency which is a multiple of the frequency at which the H-bridge alternates between the first condition and the second condition. In this way, the switching signal to the switching elements of the converter and the H-bridge can be generated from the same oscillator, for example using a divider.

In the preferred arrangement, the capacitive load is an electroluminescent lamp.

These and other features of the present invention will become apparent upon review of the following detailed description of the invention when taken in conjunction with the drawings and appended claims.

BRIEF DESCRIPTION OF THE DRAWINGS

Some embodiments of the invention will now be described by way of example only and with reference to the accompanying drawings, in which:

FIG. 3 illustrates the operation of a preferred embodiment of the invention.

DETAILED DESCRIPTION OF THE INVENTION

In the embodiments described, corresponding reference signs have been used to indicate corresponding components.

Figure 1A:
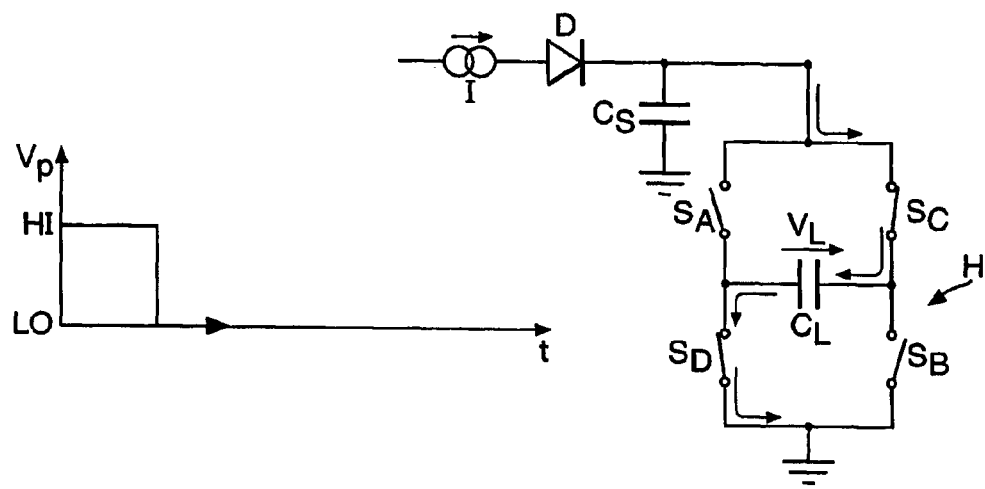
FIG. 1a and FIG. 1b represent the operation of an H-bridge in accordance with the invention.

Referring to FIG. 1a, there is shown an electronic circuit in accordance with the invention. The circuit comprises a current source I in series with a diode D and an H-bridge arrangement H. A smoothing capacitor $C_S$ is provided in parallel with the H-bridge arrangement H and is connected to earth potential.

The H-bridge arrangement H in FIG. 1a comprises four switching elements $S_A$ to $S_D$ which are represented as simple switches for reasons of clarity. In a practical circuit, the switches $S_A$ to $S_D$ are provided by field effect transistors (FETs). The H-bridge comprises two parallel limbs each having two switches $S_A$, $S_D$ and $S_C$, $S_S$ arranged in series. A capacitive load $C_L$ in the form of an electroluminescent lamp is connected between the limbs of the H-bridge at nodes on each limb which are between the switches of the limb. The H-bridge is connected to earth potential at one end.

Figure 1B:
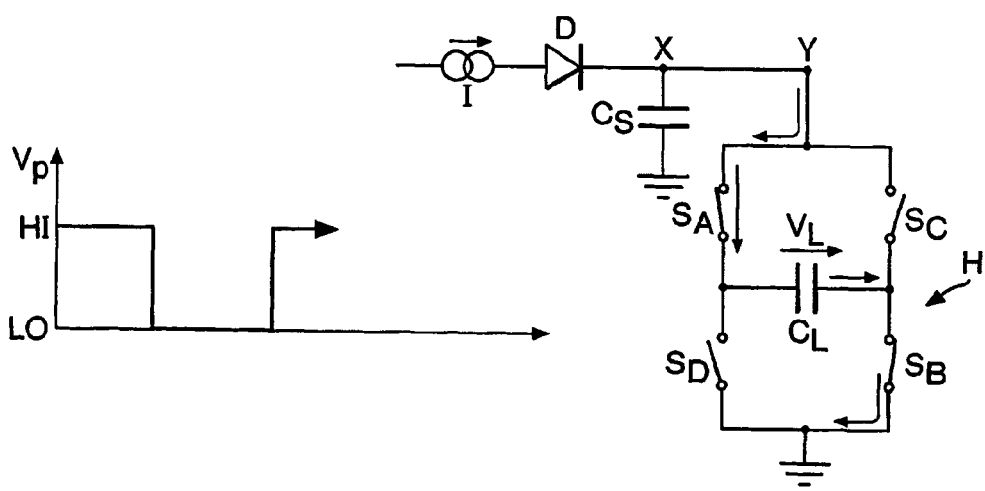

The positions of the switches $S_A$ to $S_D$ are controlled by a polarity voltage $V_P$, the variation of which over time is represented in FIGS. 1a and 1b. When $V_P$ is low, switches $S_A$ and $S_D$ are open and do not conduct and switches $S_C$ and $S_D$ are closed and conduct. This situation is shown in FIG. 1a. When $V_P$ is high, switches $S_A$ and $S_B$ are closed and conduct while switches $S_C$ and $S_D$ are open and do not conduct. This situation is illustrated in FIG. 1b.

The operation of the circuit shown in FIGS. 1a and 1b will now be described. A converter such as a flyback converter or forward converter, represented as a current source I, supplies current via the diode D to the smoothing capacitor $C_S$ and the capacitive load $C_L$. The direction in which the capacitive load $C_L$ is charged is determined by the position of the switches $S_A$ to $S_D$. The capacitors $C_S$ and $C_L$ continue to be charged until the current source I ceases to supply current. The voltage on the capacitors $C_S$ and $C_L$ consequently rises. Reverse current flow from the capacitors is prevented by the diode D.

Thus, when the capacitive load $C_L$ is fully charged to the load voltage $V_L$, the charge thereon is $C_L V_L$ and the charge on the smoothing capacitor is $C_S V_L$. When the polarity voltage $V_P$ goes high, as shown in FIG. 1b, the polarity of the charged capacitive load $C_L$ with respect to the smoothing capacitor $C_S$ and the current source is reversed. Thus, point Y in FIG. 1b is at a potential $-V_L$ relative to earth potential, while the potential at point X is $+V_L$ relative to earth potential. This potential difference causes current to flow until points X and Y are at the same potential.

If the capacitance of the smoothing capacitor $C_S$ is large, it supplies sufficient charge to the capacitive load $C_L$ to bring the voltage on the capacitive load $C_L$ up to approximately the load voltage $V_L$. However, in doing so, the smoothing capacitor $C_S$ has provided $2C_L V_L^2$ of energy to the capacitive load which must be replaced from the current source I. Thus, for each cycle of the H-bridge, $4C_L V_L^2$ of energy is drawn from the current source I.

In accordance with the invention, however, the capacitance of the smoothing capacitor $C_S$ is chosen to be smaller than that of the capacitive load $C_L$, such that when the polarity voltage $V_P$ goes high, the smoothing capacitor $C_S$ does not have sufficient stored charge to maintain the voltage at point X at the load voltage $V_L$ and consequently the voltage at X and Y collapses to earth potential. The capacitive load $C_L$ is then charged back to the load voltage $V_L$ from the current source I. In this way, current is drawn from the current source I at a relatively low voltage rather than from the large smoothing capacitor at a high voltage. With a small smoothing capacitor $C_S$ only $C_L V_L^2$ of energy is required per cycle.

Figure 2A:
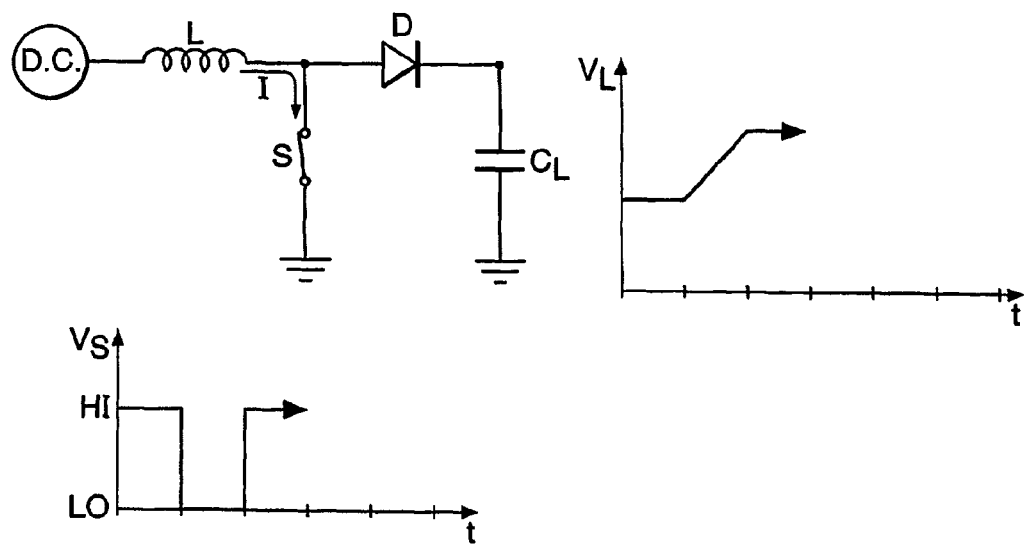
FIG. 2a and FIG. 2b illustrate the operation of a flyback converter for use with the invention.
Figure 2B:
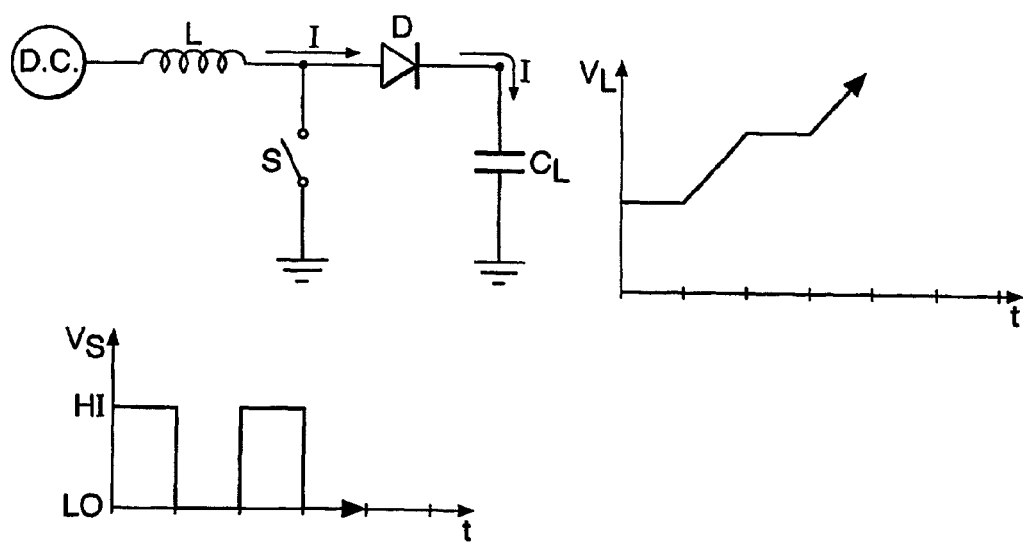

FIGS. 2a and 2b show an arrangement of a flyback converter for charging a capacitive load to a high voltage. The flyback converter shown in FIG. 2 can be used with the H-bridge arrangement H shown in FIG. 1, by replacing the components $C_L$ downstream of the diode D in FIG. 2 with the components $C_S C_L S_A$–$S_D$ downstream of the diode D in FIG. 1. For the sake of simplicity the capacitive load $C_L$ is shown in FIG. 2 without the H-bridge.

As shown in FIG. 2a, the flyback converter comprises a DC supply in series with an inductor L and a switch S. The switch S is connected between the inductor and earth potential. In a practical arrangement, the switch S is provided by a field effect transistor, the output FET. However, for the sake of clarity, in FIGS. 2a and 2b the switch S is shown as a simple switch.

In parallel with the switch S is provided a diode D in series with the capacitive load $C_L$. The capacitive load $C_L$ is arranged between the diode and earth potential.

The switch S is controlled by a switch voltage $V_S$ which varies over time as indicated in FIG. 2a. When the switch voltage $V_S$ is high, the switch S is closed and conducts. This situation is shown in FIG. 2a. When the switch voltage $V_S$ is low, the switch S is open and does not conduct. This situation is shown in FIG. 2b.

The circuit shown in FIGS. 2a and 2b operates as follows. While the switch voltage $V_a$ is high, as shown in FIG. 2a, current I flows from the DC supply through the inductor L and the closed switch S to earth. Assuming the voltage on the capacitive load $C_L$ is higher than the DC supply voltage, no current flows through the diode D.

When the switch voltage $V_S$ goes low, as shown in FIG. 2b, the current path through the inductor L and switch S is interrupted by the open switch S. However, the energy stored in the magnetic field associated with the inductor L forces the current I to continue flowing and the inductor L generates a sufficiently high voltage that the current I flows through the diode D to charge the capacitive load $C_L$. In this way, with each transition of the switch voltage $V_S$ from high to low, the voltage $V_L$ on the capacitive load $C_L$ is increased, as indicated in FIG. 2b. The diode D prevents current flow back from the capacitive load $C_L$ to earth or to the DC supply when the switch S is closed.

It will be seen therefore that the capacitive load $C_L$ can be charged to any desired voltage by applying an alternating switch voltage $V_S$ to the switch S.

FIG. 6 shows a circuit in accordance with a preferred embodiment of the invention. The circuit combines the features of the converter of FIG. 2 and the H-bridge of FIG. 1.

The circuit shown in FIG. 3 comprises an inductor L in series with an n-channel FET. The n-channel FET provides the output switch S. The gate of the n-channel FET S is supplied with a control voltage signal $V_C$.

The DC supply is arranged in series with the inductor L for supplying a current $I_S$.

The circuit shown in FIG. 6 further comprises an H-bridge H. A smoothing capacitor $C_S$ is provided in parallel with the H-bridge H and has a capacitance of around 1 nF.

The H-bridge H comprises two parallel limbs. The first limb comprises a p-channel PET $S_A$ in series with an n-channel FET $S_D$. Between the two FETs $S_A$ and $S_D$ there is a connection for the capacitive load $C_L$, which is an electroluminescent lamp with a capacitance of around 10 nF. The gates of the PETs $S_A$ and $S_D$ are supplied with a polarity voltage $V_P$. The other limb of the H-bridge comprises a p-channel FET $S_C$ in series with an n-channel FET $S_B$. The capacitive load $C_L$ is connected to a point between the two FETs $S_C$ and $S_B$. The gates of the FETs $S_C$ and $S_B$ are supplied with the inverse of the polarity voltage $V_P$ by means of an inverter INV.

As indicated by the voltage graphs in FIG. 3, one cycle of the circuit comprises two distinct, recurring phases. In the first phase, the polarity voltage $V_P$ is high, such that FETs $S_C$ and $S_D$ conduct while FETs $S_A$ and $S_B$ do not conduct. The control voltage $V_C$ to the output FET S pulses so that the output FET S alternately conducts and does not conduct. Consequently, the changing current through the inductor L charges the smoothing capacitor $C_S$ and the capacitive load $C_L$, via the FET $S_C$. The voltage $V_L$ across the capacitive load $C_L$ in the direction of the arrow in FIG. 3 rises due to the increased charge on the capacitive load $C_L$, as does the voltage $V_{HV}$ at point X.

In the second phase, the polarity voltage $V_P$ goes low, such that the FETs $S_C$ and $S_D$ cease to conduct and the FETs $S_A$ and $S_S$ begin to conduct. The polarity of the capacitive load $C_L$ relative to the point X is therefore reversed. When this change of polarity occurs, current is drawn from the smoothing capacitor $C_S$ and subsequently the DC supply to discharge the negative charge on the capacitive load $C_L$.

During this phase, the control voltage $V_C$ to the output FET S is pulsed so that current is drawn intermittently from the DC supply through the inductor L to charge the capacitive load $C_L$. However, because the FETs $S_A$ and $S_B$ are conducting rather than the FETs $S_C$ and $S_D$, the capacitive load $C_L$ is charged with current in the opposite direction to that in the first phase, so that a negative voltage relative to the voltage $V_{HV}$ at point X is provided on the capacitive load $C_L$.

Between the second phase and the repeat of the first phase, the polarity voltage $V_P$ goes high. Again, the voltage $V_{HV}$ at point X collapses and the capacitive load $C_L$ is discharged by drawing current from the DC supply.

Thus, it will be seen that according to this arrangement there is provided a simple, energy efficient power supply for an electroluminescent lamp.

In summary, a high voltage AC power supply circuit for a capacitive load $C_L$, such as an electroluminescent lamp, includes a low voltage DC supply, an inductor L and a FET S in series. The FET S can be pulsed so that the inductor L generates a voltage to charge the capacitive load $C_L$ via an H-bridge H, which is in parallel with the FET S. A diode D prevents current discharging from the capacitive load $C_L$ while the FET S is closed. The total capacitance downstream of the diode D and in parallel with the capacitive load $C_L$ is less than the capacitive load $C_L$, so that when the polarity of the H-bridge is reversed, the voltage across the H-bridge collapses to earth and the capacitive load $C_L$ is discharged via the low voltage DC supply. The circuit has a lower power consumption than circuits which a employ a large smoothing capacitor in parallel with the H-bridge.

It should be apparent that the foregoing relates only to the preferred embodiments of the present invention and that numerous changes and modification may be made herein without departing from the spirit and scope of the invention as defined by the following claims and the equivalents thereof.

The invention claimed is:

1. An electronic circuit for supplying a capacitive load, such as an electroluminescent lamp, with an alternating high voltage from a lower voltage DC supply, the circuit comprising:

an H-bridge having two parallel limbs, each limb having a first switch element in series with a second switching element and a node between the first and second switching elements, the capacitive load being connected, in use, between the respective nodes of the limbs;

a converter powered by the low voltage DC supply and arranged to supply current to the H-bridge to charge the capacitive load to a voltage which is higher than the DC supply voltage; and a diode arranged in series between the converter and the H-bridge to prevent current flowing back from the charged capacitive load;

and a capacitor provided downstream from the diode in parallel with the H-bridge, wherein the switching elements of the H-bridge are controlled alternately such that in a first condition the first switching elements of one limb and the second switching elements of the other limb conduct to supply current from the converter to the capacitive load in one direction, and in a second condition the other two switching elements of the limbs conduct to supply current from the converter to the capacitive load in the opposite direction, and the total capacitance provided in parallel with the H-bridge downstream of the diode is less than 50% of the capacitance of the capacitive load.

2. An electronic circuit as claimed in claim 1, wherein the total capacitance provided in parallel with the H-bridge downstream of the diode is at least 10% of the capacitance of the capacitive load.

3. An electronic circuit as claimed in claim 1, wherein the total capacitance provided in parallel with the H-bridge downstream of the diode is between 10% and 20% of the capacitance of the capacitive load.

4. An electronic circuit as claimed in claim 1, wherein the converter comprise an inductive element and an output switching element arranged in series; and the output switching element is arranged to alternate, in use, between a first state and a second state, whereby in the first state a current path is provided through the inductive element and the output switching element, which current path is interrupted in the second state, such that when the output switching element changes from the first state to the second state, the inductive element generates a voltage at an output of the circuit for charging a capacitive load.

* * * * *